(12) United States Patent
Nishimura et al.

(10) Patent No.: US 6,205,286 B1
(45) Date of Patent: *Mar. 20, 2001

(54) IMAGE PICKUP APPARATUS HAVING IMAGE INFORMATION COMPRESSING FUNCTION

(75) Inventors: Ryuji Nishimura; Iwao Aizawa, both of Yokohama; Takuya Imaide, Fujisawa., all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,412

(22) Filed: Mar. 26, 1997

Related U.S. Application Data (63) Continuation of application No. 08/319,793, filed on Oct. 7, 1994, now abandoned.

(30) Foreign Application Priority Data

Oct. 7, 1993 (JP) .................................................. 5-251695

(51) Int. Cl.[7] .................................................. H04N 5/92
(52) U.S. Cl. .......................... 386/107; 386/111; 358/906
(58) Field of Search .................................. 386/107, 117, 386/95, 111, 112, 46; 358/906, 909.1; 348/208, 219, 416, 64

(56) References Cited

U.S. PATENT DOCUMENTS

| | | | |
|---|---|---|---|
| 4,931,879 | * 6/1990 | Koga et al. | 386/111 |
| 5,047,850 | * 9/1991 | Ishii et al. | 348/416 |
| 5,153,783 | * 10/1992 | Tamada et al. | 358/906 |
| 5,168,363 | * 12/1992 | Kojima et al. | 358/906 |
| 5,173,779 | * 12/1992 | Lee | 358/909.1 |
| 5,212,742 | * 5/1993 | Normile et al. | 382/166 |
| 5,278,663 | * 1/1994 | Hong | 358/335 |

(List continued on next page.)

FOREIGN PATENT DOCUMENTS

| | | |
|---|---|---|
| 62-206282 | 11/1987 | (JP) . |
| 1-256290 | 10/1989 | (JP) . |
| 2-274081 | 11/1990 | (JP) . |
| 3-291081 | 12/1991 | (JP) . |
| 5-130489 | 5/1993 | (JP) . |
| 5-130602 | 5/1993 | (JP) . |

OTHER PUBLICATIONS

The Institute of Television Engineers of Japan vol. 45, No. 7 pp. 793 to 799 and 807 to 812.
The Institute of Television Engineers of Japan vol. 35, No. 10, pp. 949 to 954.
The Technical Report of The Institute of Television Engineers of Japan vol. 15, No. 7, pp. 43 to 48, 1991.

*Primary Examiner*—Huy Nguyen
(74) *Attorney, Agent, or Firm*—Antonelli, Terry, Stout & Kraus, LLP (57) ABSTRACT

The invention relates to an image pickup apparatus for outputting a video signal encoded in order to compress information amount of a photographed image. The apparatus includes: an image pickup device for outputting a digital video signal; a control unit to control the image pickup device; and an encoding apparatus for encoding the digital video signal which is output from the image pickup device. The control unit generates control information of the image pickup device. The encoding apparatus changes encoding characteristics on the basis of the control information. Further, the encoded digital video signal is recorded and/or reproduced onto/from a recording medium and the signal reproduced from the recording medium is decoded. Moreover, a motion vector of a hand vibration or the like is detected from the photographed video signal and is corrected. In addition, an output signal of the encoding apparatus is output to a digital communication terminal and the signal input from the digital communication terminal is decoded.

82 Claims, 7 Drawing Sheets

U.S. PATENT DOCUMENTS 5,291,300 * 3/1994 Ueda ..................................... 386/117
5,331,419 * 7/1994 Yamada et al. ........................ 348/64
5,402,171 * 3/1995 Tagami et al. ........................ 348/219
5,430,480 * 7/1995 Allen ..................................... 348/208

* cited by examiner

IMAGE PICKUP APPARATUS HAVING IMAGE INFORMATION COMPRESSING FUNCTION

This application is a continuation application of Ser. No. 08/319,793, filed Oct. 7, 1994, now abandoned.

BACKGROUND OF THE INVENTION

The present invention relates to an image pickup apparatus and, more particularly, to an image pickup apparatus for generating a video signal encoded to compress an information amount of a photographed image.

A digitalizing technique of a video signal is being improved and a high efficient coding of a moving image is being performed. As an example of the conventional technique of such a coding algorithm, there is an interframe predictive coding for coding a difference between frames in the video signal. Such a coding relates to a coding system for reducing an information amount by using a correlation between adjacent frame images. Further, there is known a motion compensation interframe predictive coding to improve a coding efficiency of an image including a fast motion by adding a motion compensation to the above system.

Such a coding system is adopted in an MPEG (Moving Picture Expert Group) as coding standard specifications for digital storage, H.261 of the ITU-T (International Telecommunication Union-Telecommunication Standardization Sector) as coding standard for communication such as a television telephone, and the like. As for a method for encoding/decoding in accordance with the above specifications, they are disclosed in, for example, the magazine of The Institute of Television Engineers of Japan, Vol. 45, No. 7, pages 793 to 799 and 807 to 812, 1991.

In those conventional methods, however, since the signal is encoded by using the correlation between the frames, there is a problem such that image quality is deteriorated in the cases where the present image is different from the preceding image or where the motion is fast, where the frame correlation is low and the motion compensation is difficult, for example, the case where the operation such as switching of the scene (scene change), fading for gradually erasing the image, zoom, or the like is performed. With respect to a technique for solving such a problem, there is, for example, a technique disclosed in the magazine of The Institute of Television Engineers of Japan, Vol. 35, No. 10, pages 949 to 954, 1985. However, according to the technique disclosed in such reference, a circuit scale increases because the fading prediction is performed. In particular, in the case where such an encoding function is installed in an image pickup apparatus in which miniaturization is required, an increase in circuit scale causes a large problem.

SUMMARY OF THE INVENTION

It is a main object of the present invention to prevent a deterioration of an image quality even for an image having a low frame correlation.

Another object of the invention is to generate a high efficiently encoded (i.e., compressed) video signal by a simple circuit construction of a small scale.

Still another object of the invention is to record/reproduce an encoded (i.e., compressed) video signal.

Further another object of the invention is to digitally communicate an encoded (i.e., compressed) video signal through a transmitting circuit.

In order to solve the above problems, according to the present invention, there is provided an image pickup apparatus comprising: image pickup means for generating a digital video signal; control means for controlling the image pickup means; and image compression means for image compressing the digital video signal which is generated by the image pickup device, wherein the control means generates control information of the image pickup means and the image compression means changes encoding characteristics on the basis of the control information of the image pickup means.

The image pickup means executes a desired signal process to the image pickup signal and generates the digital video signal. The control means for controlling the image pickup means transmits a control signal corresponding to a photographing operation such as start and end of the photographing (scene change), zoom, an to move the camera to the right and left, tilt to vertically move the camera, fading, or the like to the image pickup means, thereby controlling the image pickup means. The image compression means interframe encodes the video signal that is output from the image pickup means and generates the compression signal. In this instance, the encoding characteristics are changed in accordance with the above photographing operation by using the control signal that is output from the control means.

As mentioned above, by encoding by using the control information of the image pickup means, a state which becomes a cause of the image quality deterioration such as a scene change or the like can be easily detected without using any complicated predicting means, so that the optimum encoding corresponding to the state can be performed. Due to this, an image pickup apparatus in which a deterioration of the image quality is small even for an image of a low frame correlation and a circuit scale is small can be realized.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

The present invention will now be described hereinbelow with respect to the embodiments shown in FIGS. 1 to 7.

Figure 1:
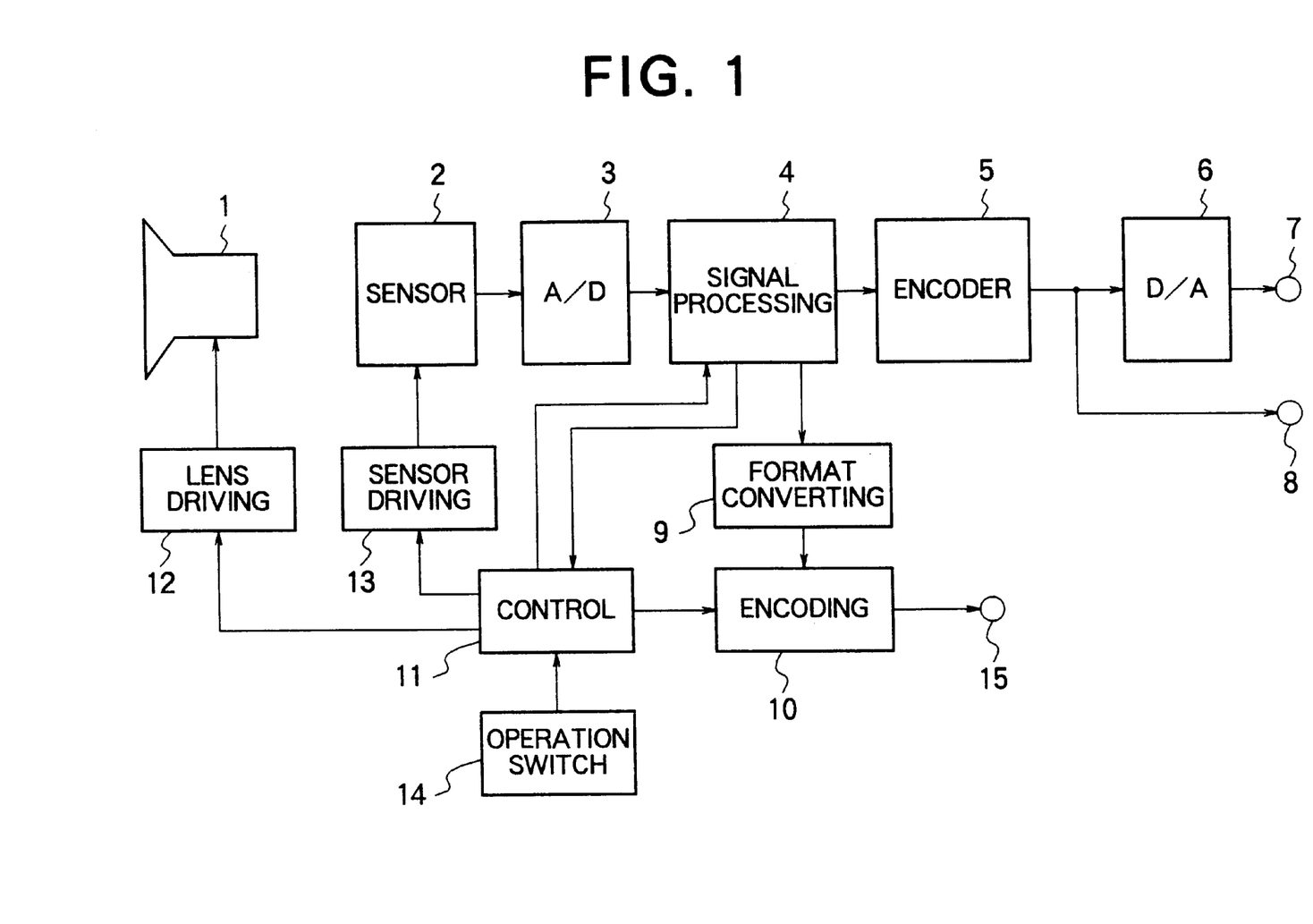
FIG. 1 is a block diagram showing a construction of an image pickup apparatus according to the first embodiment of the invention.

FIG. 1 is a block diagram showing a construction of an image pickup apparatus according to the first embodiment of the invention. In the diagram, reference numeral 1 denotes a lens to form an image of an incident photosignal onto a sensor (image pickup device) 2 such as a CCD (Charge Coupled Device) or the like. The sensor 2 converts the image formed photosignal into the electric signal and generates as an image pickup signal. Reference numeral 3 denotes an A/D converting circuit for converting the analog image pickup signal into the digital signal and for supplying the same to a signal processing circuit 4. The signal processing circuit 4 performs well-known processes such as gamma correction for correcting a non-linear component of a CRT (cathode ray tube) or the like into a linear component, white balance correction for correcting an imbalance which occurs in R and B components when the light component is divided into R, G, and B components, and the like to the digitized image pickup signal and generates the digital video signal comprising a luminance signal and color difference signals.

The signal processing circuit 4 is controlled by a control circuit 11 that is controlled by a microcomputer. The user who operates the image pickup apparatus inputs the contents of the operations such as color balance of R, G, and B, zoom magnification, shutter speed, and the like by an operation switch 14. Such camera operations include operations such as start and end of the photographing, zoom, fading, and the like. The control circuit 11 controls the signal processing circuit 4, a lens driving circuit 12, and a sensor driving circuit 13 in accordance with the contents. The lens driving circuit 12 controls a zoom magnification. The sensor driving circuit 13 controls a shutter speed or the like. The control circuit 11 supplies control information of the signal processing circuit 4 and the like to an image compression circuit 10. The image compression circuit 10 performs the encoding (i.e., compression) by using the control information as will be described hereinlater.

The digital video signal generated from the signal processing circuit 4 is supplied to an encoder 5 and a format converting circuit 9. The encoder 5 converts the digital video signal into the signal according to a standard television system. After that, a signal from the encoder 5 is output as an analog signal from an output terminal 7 through a D/A converting circuit 6 and as a digital signal from an output terminal 8.

When converting signals of different television systems into the same digital signal, it is desirable to once convert those signals into a common format. For this purpose, the format converting circuit 9 converts the digital video signal generated from the signal processing circuit 4 into an intermediate format necessary to encode. Such a format depends on the system of the image compression which is performed by the encoding circuit 10. For example, when performing the encoding in accordance with the H.261 standards for communication, the format is a CIF (Common Intermediate Format) or a QCIF (Quarter CIF). When performing another encoding, it is sufficient to convert into a format which is permitted by such an encoding.

The image compression circuit 10 encodes (i.e., compresses) the input signal by a method such as an interframe predictive encoding or the like. Encoding according to special standards can be also performed or another encoding is also possible. When encoding, the image compression circuit 10 encodes by using the control information which is generated from the control circuit 11. The control information includes the presence or absence of the operation such as scene change, zoom, pan, tilt, fading, or the like, which becomes a cause of the image quality deterioration.

The image compression circuit 10 changes the encoding characteristics so as to perform the optimum encoding in accordance with the contents of the camera operation. The signal encoded by the image compression circuit 10 is output from an output terminal 15.

Figure 2:
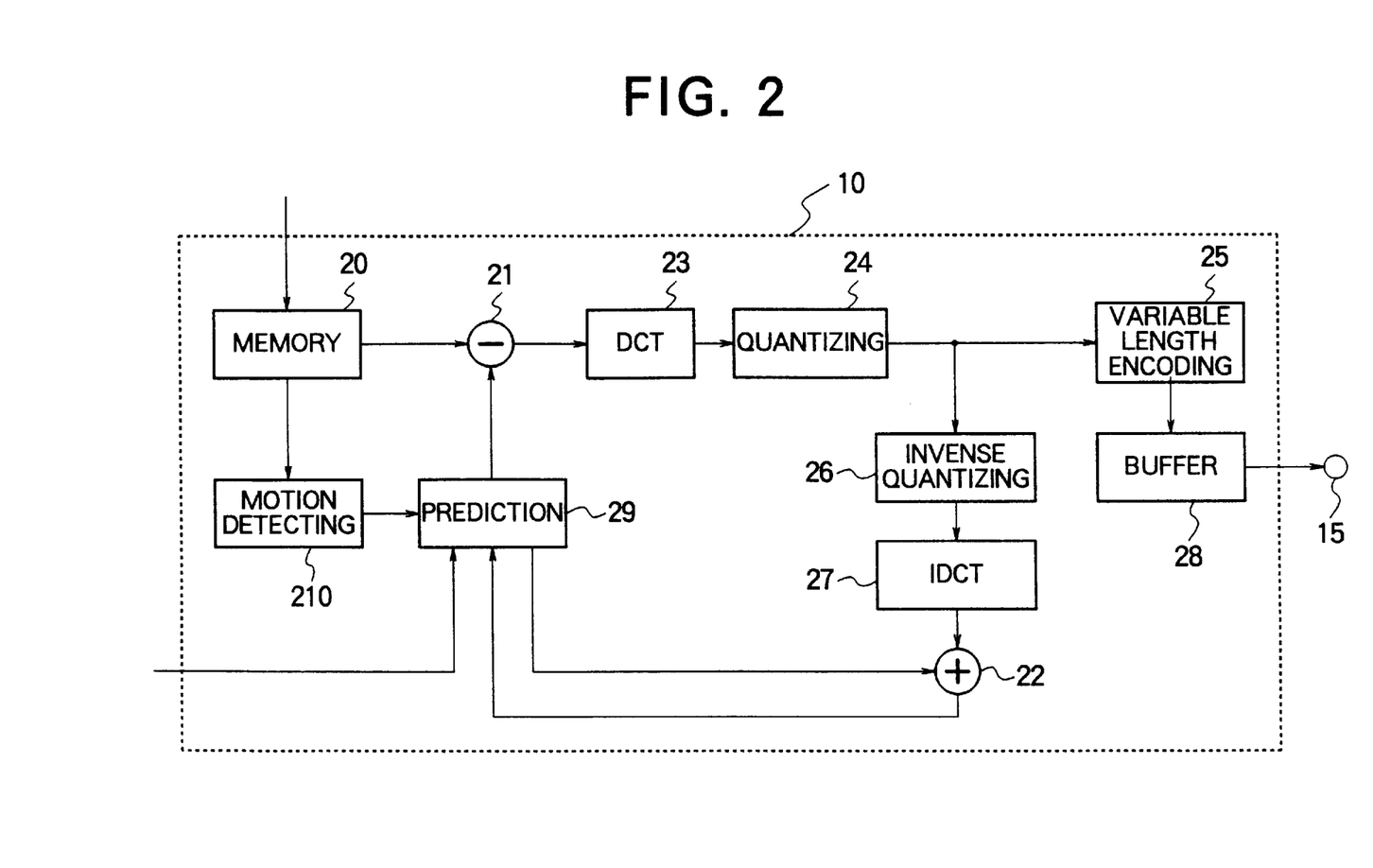
FIG. 2 is a block diagram showing an example of a construction of an image compression circuit in FIG. 1.

The encoding in the encoding circuit 10 will now be described. Many systems have been proposed with respect to the image compression system and any system can be used. However, a case of encoding (i.e., compressing) on the basis of the MPEG will now be described hereinbelow as an example. FIG. 2 is a block diagram showing an example of the construction of the image compression circuit 10 in FIG. 1. Although FIG. 2 shows the encoding based on a general construction to realize the MPEG encoding, it differs from the conventional encoding with respect to a point that the control information generated by the control circuit 11 in FIG. 1 is used in a predictor 29 and a quantizing circuit 24 for deciding the encoding characteristics.

An input signal of a frame memory 20 in FIG. 2 is an output signal of the format converting circuit 9 in FIG. 1 and is stored into the frame memory 20. A subtracter 21 obtains a difference between an output signal of the frame memory 20 and a signal generated from the predictor 29, thereby forming an interframe difference signal. The interframe difference signal is intraframe encoded by a DCT (Discrete Cosine Transform) circuit 23 and, after that, the intraframe encoded signal is quantized by the quantizing circuit 24 in order to reduce a code amount. The quantized signal is supplied to a variable length encoding circuit 25 and an inverse quantizing circuit 26. The signal which was Huffman coded by the variable length encoding circuit 25 is output from the output terminal 15 via a frame buffer 28.

On the other hand, the quantized encoded signal which is output from the quantizing circuit 24 is decoded and returned to the original signal by a decoding circuit comprising the inverse quantizing circuit 26, an IDCT (Inverse DCT) circuit 27, and adder 22 and is sent to the predictor 29. The predictor 29 generates an output signal according to a prediction mode and executes a motion compensation using a motion vector which is generated by a motion detecting circuit 210. A method of changing the encoding characteristics in the predictor 29 by using the control information generated from the control circuit 11 (FIG. 1) will now be described. In case of the MPEG, there are three kinds of picture plane types which are used for the interframe prediction: namely, an I picture in which the intraframe encoding is performed but the prediction is not executed; a P picture for performing the forward one-side prediction by using the image which has already been reproduced; and a B picture for performing the front and back both-side prediction by using the image which has already been reproduced image and an image which will be reproduced in future and is not yet reproduced.

Since the I picture relates to a frame image for performing only the intraframe encoding, it is possible to suppress a propagation of an error which occurs due to the interframe encoding by fetching many I pictures. However, an information amount of image obviously increases.

The P picture relates to a frame image for executing the forward one-side prediction from the past I picture or the P picture. The P picture is set to a reference image of the subsequent P picture or the adjacent B picture. By increasing the number of P pictures, the number of I pictures can be reduced and the encoding efficiency can be improved.

The B picture relates to a frame image for performing the front and back both-side prediction from the past and future I pictures or P pictures. A good prediction can be performed even in case of the scene change or the like. Although those three kinds of frame images can be used in the standard of the MPEG, their order and intervals can be freely set. The selection of the I picture, P picture, or B picture is decided on the encoding side.

Figure 3A:
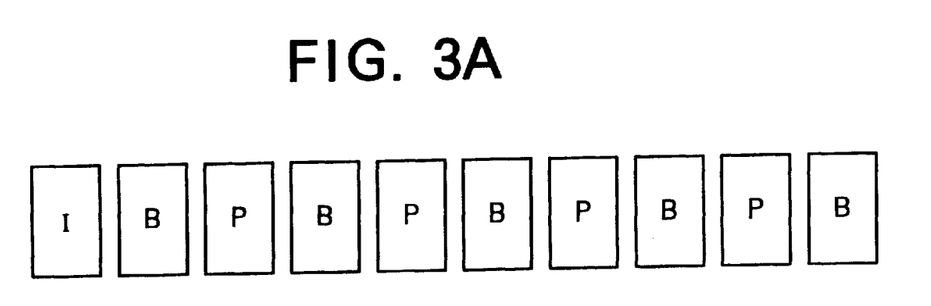
FIGS. 3A and 3B are explanatory diagrams each showing an example of a picture sequence according to the first embodiment of the invention shown in FIG. 1.
Figure 3B:
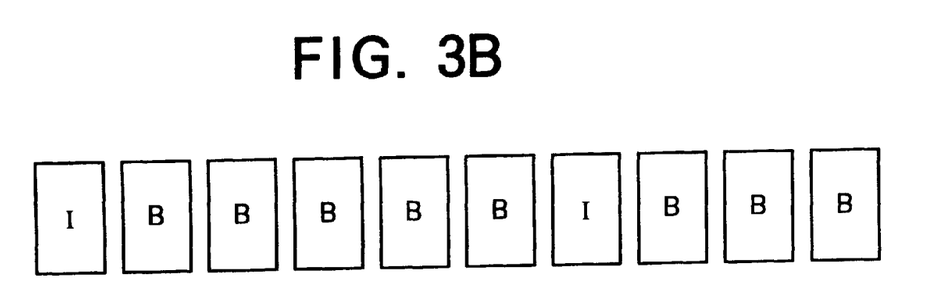

According to the invention, an arrangement (picture sequence) of the three kinds of images is switched by the control information of the image pickup apparatus. For instance, an example of the picture sequence in the case where the operation such as zoom, fading, or the like is not executed is shown in FIG. 3A. On the contrary, FIG. 3B shows an example of the picture sequence in the case where the operation such as scene change (start of the photographing), fading, zoom, pan, tilt, or the like was executed. In the example, a good image quality can be obtained by increasing the number of B pictures which are strong for the scene change or the like. In case of the zooming operation, the number of I pictures can be also increased.

In addition to the method whereby the picture sequence is switched in accordance with the operating state of the image pickup apparatus as mentioned above, the following control can be also performed. For example, in the case where the fading operation is executed, the forward prediction is performed and a quantization matrix as control parameters of the quantizing circuit 24 is simultaneously changed, so that the fading can be performed at the time of encoding.

As mentioned above, by controlling the encoding on the basis of the control information of the image pickup apparatus, it is possible to suppress the image quality deterioration at the time of the camera operation such as scene change, zoom, pan, tilt, fading, or the like. Since those operations can be judged by merely using the control information of the image pickup apparatus, a circuit scale is not increased.

Figure 4:
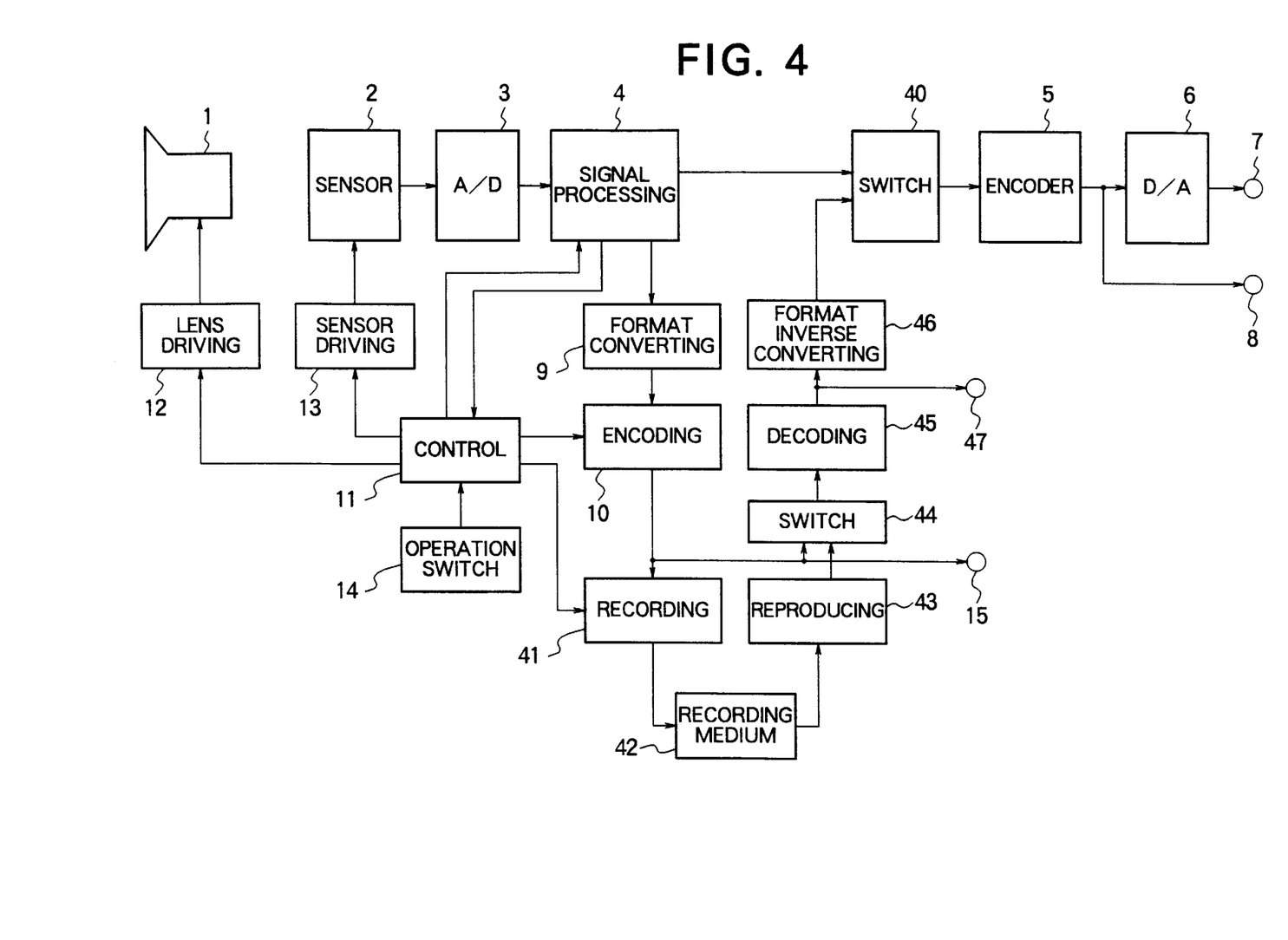
FIG. 4 is a block diagram showing a construction of an image pickup apparatus according to the second embodiment of the invention.

The second embodiment of the present invention will now be described. FIG. 4 is a block diagram showing a construction of an image pickup apparatus according to the second embodiment of the invention. The apparatus of FIG. 4 is obtained by adding recording and reproducing functions to the first embodiment in FIG. 1. In FIG. 4, in addition to the component elements shown in FIG. 1 reference numeral 41 denotes a recording circuit for recording the encoded signal to a recording medium 42. Reference numeral 43 denotes a reproducing circuit for reproducing the signal recorded on the recording medium 42 such as magnetic tape, video tape, semiconductor memory, or the like. Reference numeral 44 denotes a switch for switching the reproduction signal and the encoded signal before recording. An output signal of the switch 44 is decoded by an image decompression circuit 45. The decoded (i.e., decompressed) signal is subjected to a conversion opposite to the conversion executed by the format converting circuit 9 by a format inverse converting circuit 46. A switch 40 switches the image pickup signal and the reproduction signal for the case of reproducing the signal which has once been recorded and the case of reproducing the image which is being photographed at present as it is instead of the recorded signal.

In case of the second embodiment, since the start of recording denotes the scene change, a closed GOP (Group of Picture) flag is set to a GOP comprising a predetermined number of frames, thereby clearly indicating the switching of the scene.

The second embodiment has a construction which is almost similar to that of the first embodiment in FIG. 1 with respect to the encoding (i.e., compression), so that an effect similar to that of the embodiment in FIG. 1 can be obtained.

Figure 5:
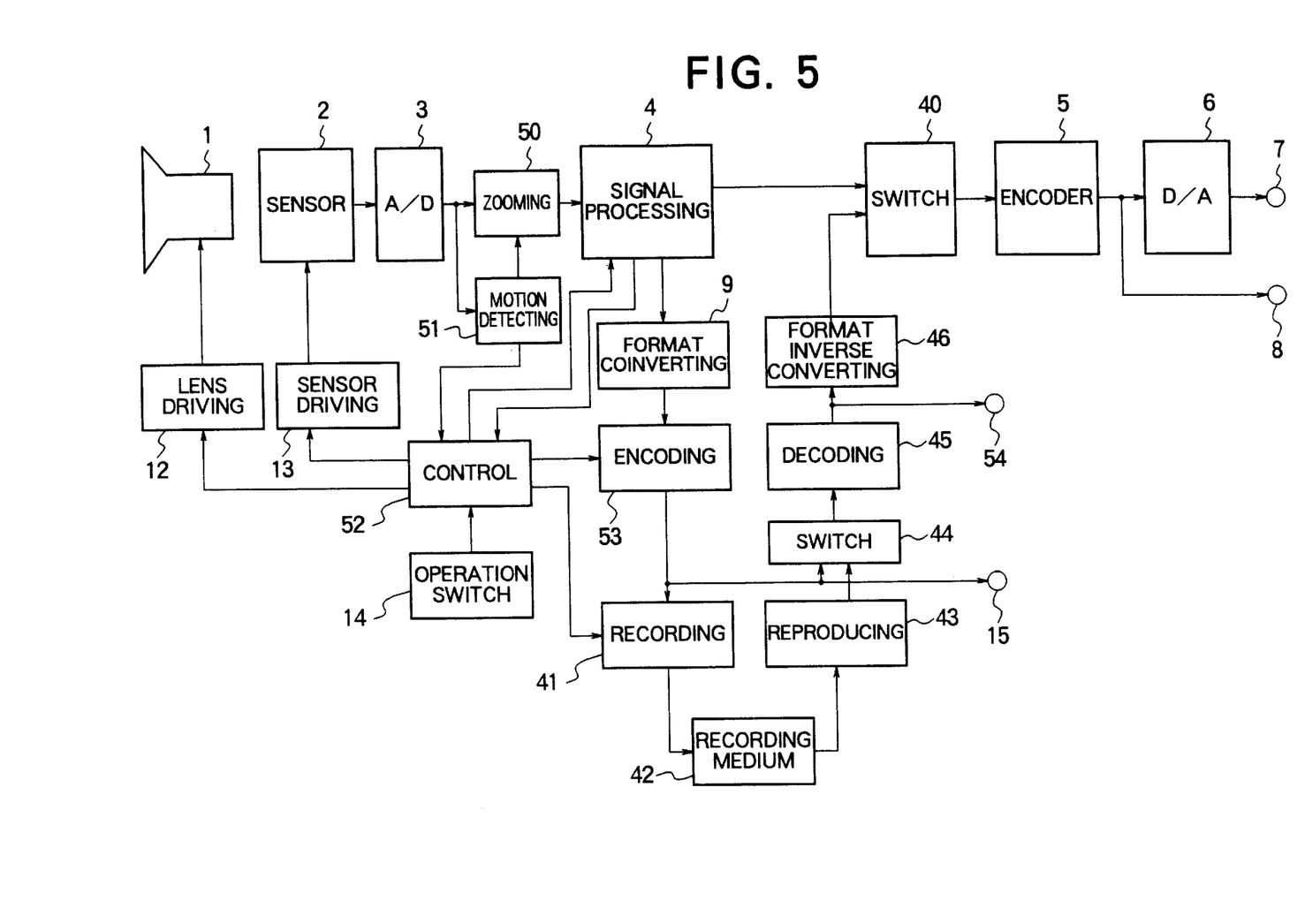
FIG. 5 is a block diagram showing a construction of an image pickup apparatus according to the third embodiment of the invention.

The third embodiment of the invention will now be described. FIG. 5 is a block diagram showing a construction of the image pickup apparatus according to the third embodiment of the invention. The third embodiment differs from the second embodiment in FIG. 4 with respect to a point that the third embodiment has a hand vibration correcting function of a camera. In FIG. 5, in addition to the component elements shown in FIG. 4, reference numeral 51 denotes a motion detecting circuit, 50 a zooming circuit, and 52 a control circuit. The motion detection circuit 51 detects a motion vector every one field (or one frame). The motion vector divides a picture plane into about 16×16 blocks and the motion vector is obtained every block. A method of correcting a hand vibration from the obtained motion vectors has been described in, for example, The Technical Report of The Institute of Television Engineers of Japan, Vol. 15, No. 7, pages 43 to 48, 1991. When the hand vibration of the camera is corrected, a motion of the whole picture plane is detected from a vector obtained every block and the output position of the image is moved by only the distance of the motion vector so as to stop the vibration of the video image, thereby correcting such a vibration.

However, when the output position of the picture plane is shifted, a problem such that the edges of the picture plane are cut out on the reproduced picture plane occurs. Therefore, a situation such that the edges of the picture plane are cut out is eliminated by using the zooming circuit 50.

In the third embodiment, the above motion detection is used for encoding. In the first embodiment of FIG. 1, the image compression circuit 10 has the motion detecting circuit 210 (FIG. 2). However, in the third embodiment, the motion detecting circuit 51 for correction of the hand vibration is commonly shared with the motion detection for encoding.

That is, an image compression circuit 53 in FIG. 5 doesn't need to use the motion detecting circuit 210 in the image compression circuit 10 shown in FIG. 2 and a construction in which such a motion detecting circuit 210 is omitted is sufficient. By commonly sharing the motion detecting circuit, the motion detection in the image compression circuit 10 becomes unnecessary, so that a circuit scale of the image pickup apparatus can be remarkably reduced.

The third embodiment further has the following other effects. That is, since the motion vector is detected before the format conversion, a precision of the motion detection is high. This is because the motion detection is executed in a state in which the image information before the pixels are thinned out is possessed by the format conversion. Further, in the third embodiment, since the motion detection is performed at the front stage of the video signal processes, when the motion vector is detected, the motion detection is not influenced by the video signal processes. For example, although the fading process is executed in the video signal processing circuit, since the motion detection has already been performed, the motion detection is not influenced by the fading process at all. Therefore, there is no fear of occurrence of an erroneous operation based on the fading process.

Figure 6:
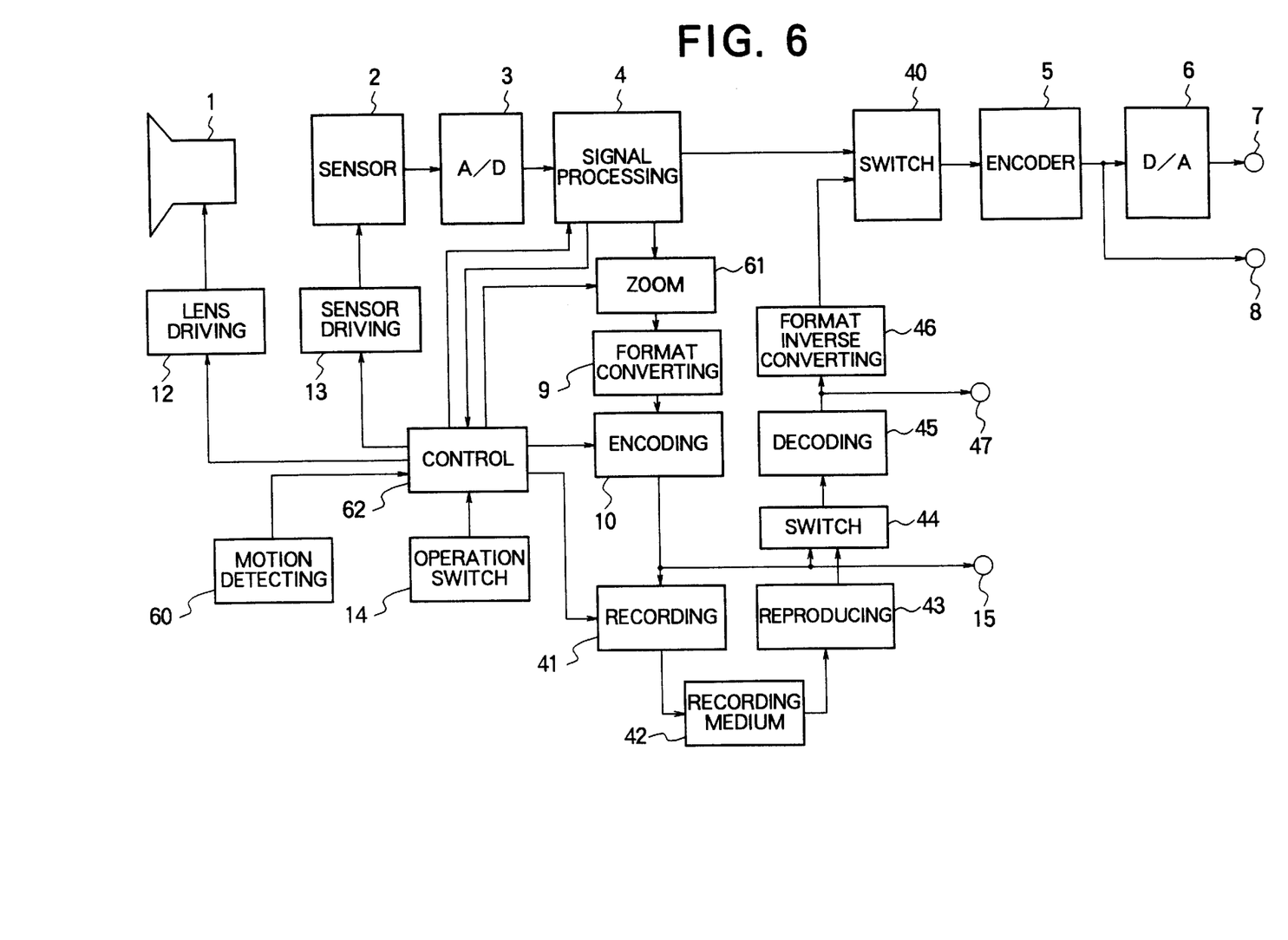
FIG. 6 is a block diagram showing a construction of an image pickup apparatus according to the fourth embodiment of the invention.

The fourth embodiment of the invention will now be described. FIG. 6 is a block diagram showing a construction of an image pickup apparatus according to the fourth embodiment of the invention. The image pickup apparatus of the fourth embodiment also has the hand vibration correcting function of the camera in a manner similar to the foregoing third embodiment. In the fourth embodiment, a motion detecting circuit 60 using an angular velocity sensor or the like is provided for the camera itself in order to prevent the hand vibration of the camera. The motion vector obtained as mentioned above expresses a uniform motion of the whole image and the motion vector of the individual block in the frame cannot be obtained. However, since the camera operation such as a pan or the like is not influenced by the noises of the video signal, the motion vector can be accurately obtained. Reference numeral 61 denotes a zooming circuit and 62 indicates a control circuit. The other effects are similar to those in the first embodiment of FIG. 1.

Figure 7:
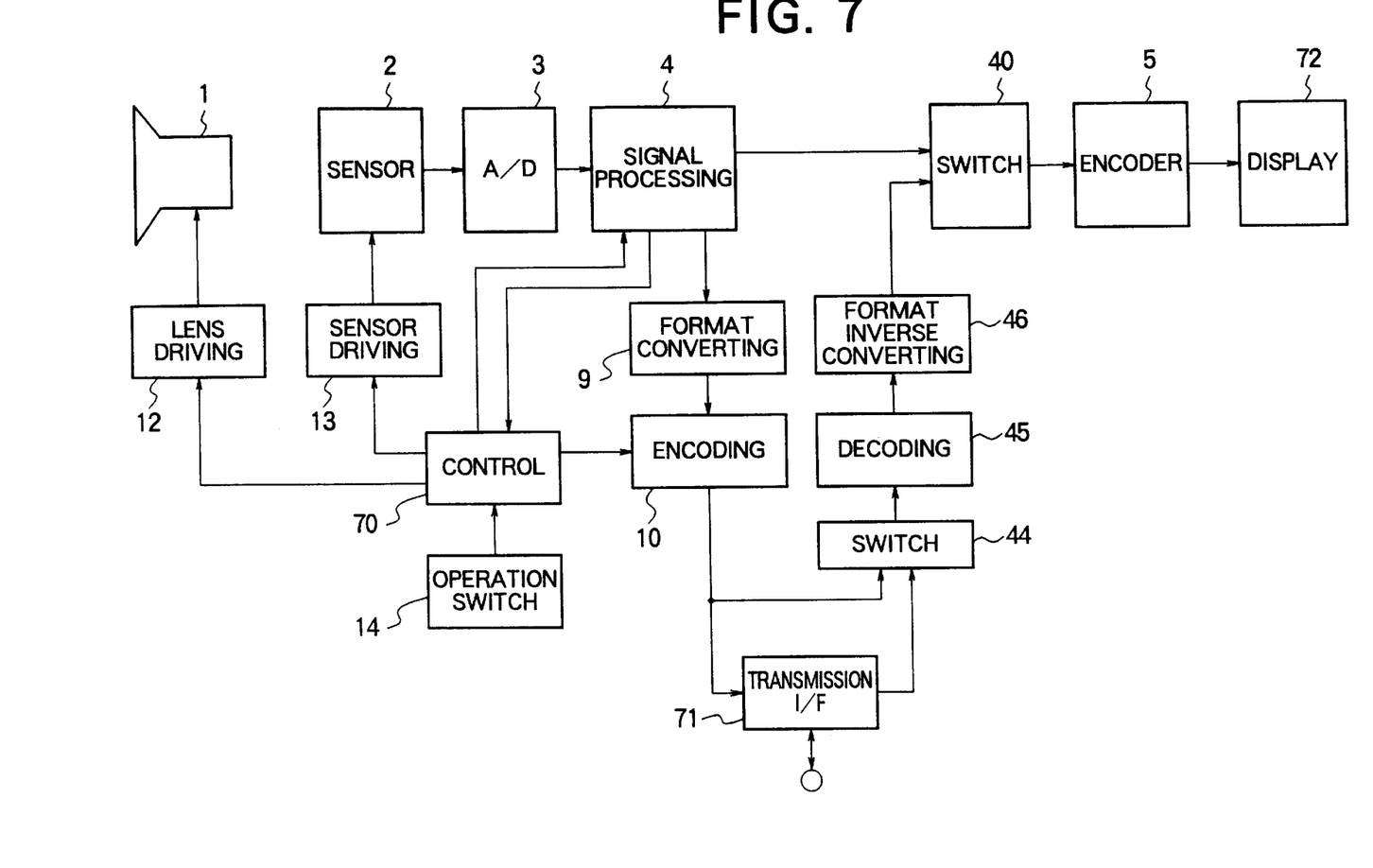
FIG. 7 is a block diagram showing a construction of an image pickup apparatus according to fifth embodiment of the invention.

The fifth embodiment of the invention will be finally described. FIG. 7 is a block diagram showing a construction of an image pickup apparatus according to the fifth embodiment of the invention. The fifth embodiment shows an example in which the image pickup apparatus of the invention is applied to a television telephone. In the fifth embodiment, a signal encoded by a control unit 70 is output to a transmission path for communication through a transmission interface circuit 71. The signal input through the transmission path is decoded by the decompression circuit 45. After that, the decoded signal is converted into the video signal and is sent to the monitor.

The encoding (i.e., compression) in the fifth embodiment is performed on the basis of the standard for communication such as H.261 or the like. Even in the embodiment with such a construction as mentioned above, effects similar to those in the first embodiment of FIG. 1 are derived.

According to the invention as mentioned above, in the image pickup apparatus having the image compression and decompression means, since the encoding is performed by using the information of the camera control such as switching of the scene, zoom, pan, tilt, fading, or the like that is output from the control circuit, the image quality deterioration can be prevented. The image pickup apparatus which can perform the encoding at a high precision by a simple circuit construction can be provided.

The encoded (i.e., compressed) video signal can be recorded and/or reproduced onto/from the recording medium.

Moreover, the encoded video signal can be digitally communicated through the transmitting circuit.

What is claimed is:

1. An image pickup apparatus comprising:

image pickup means for generating a digital video signal;

control means for controlling said image pick up means;

operation switch means to direct a start operation of recording said video signal or an end operation of recording said video signal; and image compression means for encoding said video signal to compress its volume;

wherein said image compression means includes quantizing means for quantizing said video signal, and said control means generate control information for controlling operation of said image pickup means based on operation of said operation switch means, and said image compression means controls determination of occurrences of I, P and B picture frames of said video signal by said quantizing means on a basis of said control information.

2. An apparatus according to claim 1, further comprising:

output means for outputting output signals of said image compression means to a digital communication terminal; and image decompression means for decoding signals input from said digital communication terminal;

wherein said control means control the inputs and outputs to/from said image pickup means and said digital communication terminal.

3. An image pickup apparatus according to claim 1, further comprising:

a recording/reproducing circuit which records and/or reproduces an encoded video signal onto/from a recording medium;

a decoder which decodes the signal reproduced from said recording medium; and said control means controls said encoder and said recording/reproducing circuit.

4. An image pickup apparatus according to claim 1, wherein said control means changes said parameters of the quantizing means so as to prevent image quality of low frame correlation caused by said operation of the operation switch means from deteriorating.

5. An image pickup apparatus according to claim 1, wherein said control means changes said parameters of the quantizing means so as to make a compression rate low when the operation of said operation switch means is detected.

6. An image pickup apparatus according to claim 5, further comprising:

recording/reproducing means for recording and/or reproducing the encoded video signal onto/from a recording medium; and image decompression means for decoding the signal reproduced from said recording medium.

7. An image pickup apparatus according to claim 5, wherein:

said operation switch means is also to direct a zooming operation; and said image compression means changes an encoding method of encoding said video signal on a basis of said control information.

8. An apparatus according to claim 5, wherein said image compression means change picture sequence of an I, P and B picture on a basis of said control information.

9. An apparatus according to claim 5, further comprising:

an output circuit which outputs output signals of said image compression means to a digital communication terminal; and a decoder which decodes signal inputs from said digital communication terminal, wherein said control means controls the inputs and outputs to/from said image pickup means and said digital communication terminal.

10. An apparatus according to claim 3, further comprising:

an output circuit which outputs output signals of said encoder to a digital communication terminal; and a decoder which decodes signal inputs from said digital communication terminal, wherein said control means controls the inputs and outputs to/from said digital communication terminal.

11. An image pickup apparatus according to claim 5, further comprising:

said operation switch also directs a zooming operation; and an encoder which encodes said video signal to compress its volume, wherein said encoder changes an encoding method of encoding said video signal on a basis of said control information.

12. An apparatus according to claim 11, wherein said encoder includes said quantizing means.

13. An apparatus according to claim 11, wherein said encoder changes a picture sequence of an I, P and B picture on a basis of said control information.

14. An image pickup apparatus comprising:
   image pickup means for generating a digital video signal;
   image compression means for encoding said video signal to compress its volume;
   recording/reproducing means for recording and/or reproducing an encoded video signal onto/from a recording medium;
   operation switch means to direct a start operation of recording a video signal or an end operation of recording said video signal;
   image decompression means for decoding the signal reproduced from said recording medium; and
   control means for controlling said image pickup means, said image compression means, and said recording/reproducing means;
   wherein said image compression means includes quantizing means for quantizing said video signal, and said control means generates control information for said controlling operation of image pickup means based on operation of said operation switch means, and said image compression means controls determination of occurrences of I, P and B picture frames of said video signal by said quantizing means on a basis of said control information.

15. An apparatus according to claim 14, further comprising:
   output means for outputting output signals of said image compression means to a digital communication terminal; and
   image decompression means for decoding signals input from said digital communication terminal;
   wherein said control means control the inputs and outputs to/from said image pickup means and said digital communication terminal.

16. An image pickup apparatus comprising:
   image pickup means for generating a digital video signal;
   control means for controlling said image pick-up means;
   operation switch means to direct a fading operation; and
   image compression means for encoding said video signal to compress its volume;
   wherein said control means generate control information for controlling operation of said image pickup means based on operation of said operation switch means, and said image compression means controls determination of occurrences of I, P and B picture frames of said video signal and hence changes an encoding method of encoding said video signal on basis of said control information.

17. An apparatus according to claim 16, further comprising:
   output means for outputting output signals of said image compression means to a digital communication terminal; and
   image decompression means for decoding signals input from said digital communication terminal;
   wherein said control means control the inputs and outputs to/from said image pickup means and said digital communication terminal.

18. An apparatus according to claim 16, wherein said image compression means includes quantizing means for quantizing a signal, and said image compression means change parameters of said quantizing means on a basis of said control information.

19. An apparatus according to claim 16, wherein said image compression means change picture sequence of an I, P and B picture on a basis of said control information.

20. An apparatus according to claim 16, comprising motion correcting means corrects a motion vector of a hand vibration.

21. An image pickup apparatus according to claim 16, wherein said control means changes parameters of a quantizing means so as to prevent image quality of low frame correlation caused by said operation of the operation switch means from deteriorating.

22. An image pickup apparatus according to claim 16, wherein said control means includes quantizing means for quantizing a signal and changes parameters of said quantizing means so as to make an image compression rate low in a fading operation.

23. An image pickup apparatus according to claim 22, further comprising:
   recording/reproducing means for recording and/or reproducing the encoded video signal onto/from a recording medium;
   said operation switch means is also to direct a start operation of recording a video signal or an end operation of recording said video signal; and
   image decompression means for decoding the signal reproduced from said recording medium;
   wherein said image compression means includes quantizing means for quantizing a signal and said image compression means change parameters of said quantizing means on a basis of said control information.

24. An apparatus according to claim 22, further comprising:
   output means for outputting output signals of said image compression means to a digital communication terminal; and
   image decompression means for decoding signals input from said digital communication terminal;
   wherein said control means control the inputs and outputs to/from said image pickup means and said digital communication terminal.

25. An image pickup apparatus according to claim 22, wherein:
   said operation switch means is also to direct a zooming operation.

26. An apparatus according to claim 22, wherein said image compression means includes quantizing means for quantizing a signal, and said image compression means change parameters of said quantizing means on a basis of said control information.

27. An apparatus according to claim 22, wherein said image compression means change picture sequence of an I, P and B picture on a basis of said control information.

28. An image pickup apparatus according to claim 22, further comprising:
   said image compression means including an encoder for encoding said video signal to compress its volume;
   a recording/reproducing circuit which records and/or reproduces an encoded video signal onto/from a recording medium;
   said operation switch is also to direct a start operation of recording said video signal or an end operation of recording said video signal;

a decoder which decodes the signal reproduced from said recording medium; and said control means also controls said encoder and said recording/reproducing circuit, wherein said encoder includes a quantizing circuit which quantizes a signal, and said encoder changes parameters of said quantizing circuit on a basis of said control information.

29. An image pickup apparatus according to claim 22, further comprising:

said control means also controls said sensor and signal processing circuit;

said operation switch also directs a zooming operation; and an encoder which encodes said video signal to compress its volume, wherein said encoder changes an encoding method of encoding said video signal on a basis of said control information.

30. An apparatus according to claim 29, wherein said encoder includes a quantizing circuit for quantizing a signal, and said encoder changes parameters of said quantizing circuit to said video signal on a basis of said control information.

31. An apparatus according to claim 29, wherein said encoder changes a picture sequence of an I, P and B picture on a basis of said control information.

32. An image pickup apparatus comprising:

image pickup means for generating a digital video signal;

control means for controlling said image pick up means;

operation switch means to direct a zooming operation;

lens driving means for driving a lens to control a zoom magnification based on operation of said operation switch means; and image compression means for encoding said video signal to compress its volume, wherein said control means generate control information for controlling operation of said image pickup means based on said operation of said operation switch means, and said image compression means controls determination of occurrences of I, P and B picture frames of said video signal and hence changes an encoding method of encoding said video signal on a basis of said control information.

33. An apparatus according to claim 32, further comprising:

output means for outputting output signals of said image compression means to a digital communication terminal; and image decompression means for decoding signals input from said digital communication terminal;

wherein said control means control the inputs and outputs to/from said image pickup means and said digital communication terminal.

34. An apparatus according to claim 32, wherein said image compression means includes quantizing means for quantizing a signal, and said image compression means change parameters of said quantizing means on a basis of said control information.

35. An apparatus according to claim 32, wherein said image compression means change picture sequence of an I, P and B picture on a basis of said control information.

36. An apparatus according to claim 32, comprising motion correcting means corrects a motion vector of a hand vibration.

37. An image pickup apparatus according to claim 32, wherein said control means changes parameters of a quantizing means so as to prevent image quality of low frame correlation caused by said operation of the operation switch means from deteriorating.

38. An image pickup apparatus according to claim 32, wherein said control means includes quantizing means for quantizing a signal and changes parameters of said quantizing means so as to make an image compression rate low when said control means is in a zooming operation.

39. An image pickup apparatus comprising:

image pickup means for generating a digital video signal;

control means for controlling said image pick up means;

operation switch means to direct a start operation of recording video signal; and image compression means for encoding said video signal to compress its volume, wherein said control means generate control information for controlling operation of said image pickup means based on operation of said operation switch means, and said image compression controls determination of occurrences of I, P and B picture frames of said video signal and hence generates a closed group of picture flags on a basis of said control information.

40. An image pickup apparatus comprising:

a sensor which converts an image into an electric signal;

a signal processing circuit which generates a video signal;

a control circuit which controls said signal processing circuit;

an operation switch to direct a start operation of recording said video signal or an end operation of recording said video signal; and an encoder which encodes said video signal to compress its volume, wherein said encoder includes a quantizing circuit which quantizes said video signal, and said control circuit generates control information for controlling operation for said encoder based on operation of said operation switch, and said encoder controls determination of occurrences of I, P and B picture frames of said video signal by said quantizing circuit on a basis of said control information.

41. An image pickup apparatus according to claim 40, wherein said control circuit changes said parameters of the quantizing circuit so as to prevent image quality of low frame correlation caused by said operation of the operation switch from deteriorating.

42. An image pickup apparatus according to claim 40, wherein said control circuit changes said parameters of the quantizing circuit so as to make a compression rate low when the operation of said operation switch is detected.

43. An apparatus according to claim 42, further comprising:

output means for outputting output signals of said encoder to a digital communication terminal; and image decompression means for decoding signals input from said digital communication terminal;

wherein said control means control the inputs and outputs to/from said image pickup means and said digital communication terminal.

44. An apparatus according to claim 42, further comprising:

an output circuit which outputs output signals of said encoder to a digital communication terminal; and a decoder which decodes signal inputs from said digital communication terminal, wherein said control circuit controls the inputs and outputs to/from said sensor, said signal processing circuit and said digital communication terminal.

45. An image pickup apparatus according to claim 42, further comprising:

recording/reproducing means for recording and/or reproducing the encoded video signal onto/from a recording medium; and image decompression means for decoding the signal reproduced from said recording medium;

wherein said control circuit is for controlling said encoder and said recording/reproducing means.

46. An apparatus according to claim 42, further comprising:

output means for outputting output signals of said encoder to a digital communication terminal; and image decompression means for decoding signals input from said digital communication terminal;

wherein said control circuit control the inputs and outputs to/from said digital communication terminal.

47. An image pickup apparatus according to claim 42, wherein:

said control circuit is also for controlling said sensor; and said operation switch means is also to direct a zooming operation.

48. An apparatus according to claim 45, wherein said control circuit generates control information for said sensor based on operation of said operation switch means, and said encoder changes picture sequence of an I, P and B picture on a basis of said control information.

49. An image pickup apparatus according to claim 42, further comprising:

a recording/reproducing circuit which records and/or reproduces an encoded video signal onto/from a recording medium;

a decoder which decodes the signal reproduced from said recording medium; and said control circuit controls said sensor, said encoder and said recording/reproducing circuit.

50. An image pickup apparatus according to claim 42, wherein:

said control circuit controls said sensor; and said operation switch directs a zooming operation.

51. An apparatus according to claim 42, wherein said encoder changes a picture sequence of an I, P and B picture on a basis of said control information.

52. An image pickup apparatus comprising:

a sensor which converts an image into an electric signal;

a signal processing circuit which generates a video signal;

an encoder which encodes said video signal to compress its volume;

a recording/reproducing circuit which records and/or reproduces an encoded video signal onto/from a recording medium;

an operation switch to direct a start operation of recording said video signal or an end operation of recording said video signal;

a decoder which decodes said encoded video signal reproduced from said recording medium; and a control circuit which controls said sensor, said signal processing circuit, said encoder and said recording/reproducing circuit, wherein said encoder includes a quantizing circuit which quantizes said video signal and said control circuit generates control information for controlling operation of said encoder based on operation of said operation switch, and said encoder controls determination of occurrences of I, P and B picture frames of said video signal by said quantizing circuit on a basis of said control information.

53. An apparatus according to claim 52, further comprising:

an output circuit which outputs output signals of said encoder to a digital communication terminal; and said decoder decodes signal inputs from said digital communication terminal, wherein said control circuit controls the inputs and outputs to/from said sensor, said signal processing circuit and said digital communication terminal.

54. An image pickup apparatus comprising:

a sensor which converts an image into an electric signal;

a signal processing circuit which generates a video signal;

a control circuit which controls said sensor and said signal processing circuit;

an operation switch to direct a fading operation; and an encoder which encodes said video signal to compress its volume, wherein said control circuit generates control information for controlling operation of said encoder based on operation of said operation switch, and said encoder controls determination of occurrences of I, P and B picture frames of said video signal and hence changes an encoding method of encoding said video signal on a basis of said control information.

55. An apparatus according to claim 54, further comprising:

an output circuit which outputs output signals of said encoder to a digital communication terminal; and a decoder which decodes signals input from said digital communication terminal, wherein said control circuit controls inputs and outputs to/from said sensor, said signal processing circuit and said digital communication terminal.

56. An apparatus according to claim 54, comprising a motion correcting circuit corrects a motion vector of a hand vibration.

57. An image pickup apparatus according to claim 54, wherein said control circuit changes parameters of said encoder so as to prevent image quality of low frame correlation caused by said operation of the operation switch means from deteriorating.

58. An image pickup apparatus according to claim 54, wherein said control circuit includes quantizing circuit which quantizes a signal and changes parameters of said quantizing circuit so as to make an image compression rate low in a fading operation.

59. An apparatus according to claim 58, wherein said encoder includes a quantizing circuit which quantizes a signal, and said encoder changes parameters of said quantizing circuit on a basis of said control information.

60. An apparatus according to claim 58, wherein said encoder changes a picture sequence of an I, P and B picture on a basis of said control information.

61. An apparatus according to claim 60, further comprising a motion correcting circuit which detects a motion vector of hand vibration, and which performs correction on a basis of a detected said motion vector.

62. An image pickup apparatus according to claim 58, further comprising:

recording/reproducing means for recording and/or reproducing the encoded video signal onto/from a recording medium;

said operation switch means is also to direct a start operation of recording a video signal or an end operation of recording said video signal;

image decompression means for decoding the signal reproduced from said recording medium; and said control circuit is also for controlling said encoder and said recording/reproducing means;

wherein said encoder includes quantizing means for quantizing a signal, and said encoder change parameters of said quantizing means on a basis of said control information.

63. An apparatus according to claim 58, further comprising:

output means for outputting output signals of said encoder to a digital communication terminal; and image decompression means for decoding signals input from said digital communication terminal;

wherein said control circuit controls the inputs and outputs to/from said digital communication terminal.

64. An image pickup apparatus according to claim 58, wherein:

said operation switch means is also to direct a zooming operation.

65. An apparatus according to claim 58, wherein said encoder includes quantizing means for quantizing a signal, and said encoder change parameters of said quantizing means on a basis of said control information.

66. An apparatus according to claim 58, wherein said encoder changes picture sequence of an I, P and B picture on a basis of said control information.

67. An image pickup apparatus according to claim 58, further comprising:

a recording/reproducing circuit which records and/or reproduces an encoded video signal onto/from a recording medium;

said operation switch is also to direct a start operation of recording said video signal or an end operation of recording said video signal;

a decoder which decodes the signal reproduced from said recording medium; and said control circuit also controls said encoder and said recording/reproducing circuit, wherein said encoder includes a quantizing circuit which quantizes a signal, and said encoder changes parameters of said quantizing circuit on a basis of said control information.

68. An apparatus according to claim 58, further comprising:

an output circuit which outputs output signals of said encoder to a digital communication terminal; and a decoder which decodes signal inputs from said digital communication terminal, wherein said control circuit controls the inputs and outputs to/from said sensor, said signal processing circuit and said digital communication terminal.

69. An image pickup apparatus according to claim 58, wherein:

said operation switch also directs a zooming operation.

70. An apparatus according to claim 58, wherein said encoder includes a quantizing circuit for quantizing a signal, and said encoder changes parameters of said quantizing circuit to said video signal on a basis of said control information.

71. An apparatus according to claim 58, wherein said encoder changes a picture sequence of an I, P and B picture on a basis of said control information.

72. An image pickup apparatus comprising:

a sensor which converts an image into an electric signal;

a signal processing circuit which generates a video signal;

a control circuit which controls said sensor and signal processing circuit;

an operation switch which directs a zooming operation;

a lens driving circuit which drives a lens to control a zoom magnification based on said zooming operation of said operation switch; and an encoder which encodes said video signal to compress its volume, wherein said control circuit generates control information for controlling operation of said encoder based on said operation of said operation switch, and said encoder controls determination of occurrences of I, P and B picture frames of said video signal and hence changes an encoding method of encoding said video signal on a basis of said control information.

73. An apparatus according to claim 72, further comprising:

an output circuit which outputs output signals of said encoder to a digital communication terminal; and a decoder which decodes said signal input from said digital communication terminal, wherein said control circuit controls the inputs and outputs to/from said sensor, said signal processing circuit and said digital communication terminal.

74. An apparatus according to claim 72, wherein said encoder includes a quantizing circuit for quantizing a signal, and said encoder changes parameters of said quantizing circuit on a basis of said control information.

75. An apparatus according to claim 72, wherein said encoder changes a picture sequence of an I, P and B picture on a basis of said control information.

76. An image pickup apparatus according to claim 72, wherein said control circuit changes parameters of said encoder so as to prevent image quality of low frame correlation caused by said operation of the operation switch from deteriorating.

77. An image pickup apparatus according to claim 72, wherein said control circuit includes quantizing circuit which quantizes a signal and changes parameters of said quantizing circuit so as to make an image compression rate low when said control circuit is in a zooming operation.

78. An image pickup apparatus comprising:

a sensor which converts an image into an electric signal;

a signal processing circuit which generates a video signal;

a control circuit which controls a sensor and said signal processing circuit;

an operation switch to direct a start operation of recording said video signal; and an encoder which encodes said video signal to compress its volume;

wherein said control circuit generates control information for controlling operation of said sensor and said signal processing circuit based on operation of said operation switch, and said encoder controls determination of occurrences of I, P and B picture frames of said video signal and hence generates a closed group of picture flags on a basis of said control information.

79. An image pickup apparatus comprising:

image pickup means for generating a digital video signal;

control means for controlling said image pick-up means;

operation switch means to direct a fading operation; and image compression means for encoding said video signal to compress its volume;

wherein said control means generate control information for controlling operation of said image pickup means based on operation of said operation switch means, and said image compression means changes an encoding method of encoding said video signal on basis of said control information;

wherein said image compression means change picture sequence of an I, P and B picture of said video signal on a basis of said control information;

wherein said control means controls said image compression means so as to increase a number of I pictures when said control means is in a fading operation.

80. An image pickup apparatus comprising:

a sensor which converts an image into an electric signal;

a signal processing circuit which generates a video signal;

a control circuit which controls said sensor and said signal processing circuit;

an operation switch to direct a fading operation; and an encoder which encodes said video signal to compress its volume, wherein said control circuit generates control information based on operation of said operation switch, and said encoder changes an encoding method of encoding said video signal on a basis of said control information;

wherein said encoder changes a picture sequence of an I, P and B picture of said video signal on a basis of said control information;

wherein said control circuit controls said encoder so as to increase a number of I pictures when said control circuit is in a fading operation.

81. An image pickup apparatus comprising:

image pickup means for generating a digital video signal;

control means for controlling said image pick up means;

operation switch means to direct a zooming operation; and image compression means for encoding said video signal to compress its volume, wherein said control means generate control information for controlling operation of said image pickup means based on operation of said operation switch means, and said image compression means changes an encoding method of encoding said video signal on a basis of said control information;

wherein said image compression means change picture sequence of an I, P and B picture of said video signal on a basis of said control information;

wherein said control means controls said image compression means so as to increase a number of I pictures when said control means is in a zooming operation.

82. An image pickup apparatus comprising:

a sensor which converts an image into an electric signal;

a signal processing circuit which generates a video signal;

a control circuit which controls said sensor and signal processing circuit;

an operation switch which directs a zooming operation; and an encoder which encodes said video signal to compress its volume, wherein said control circuit generates control information based on operation of said operation switch, and said encoder changes an encoding method of encoding said video signal on a basis of said control information;

wherein said encoder changes a picture sequence of an I, P and B picture of said video signal on a basis of said control information;

wherein said control circuit controls said encoder so as to increase a number of I pictures when said control circuit is in a zooming operation.

* * * * *